United States Patent
Lee et al.

(10) Patent No.: US 9,311,032 B2
(45) Date of Patent: Apr. 12, 2016

(54) IMAGE FORMING APPARATUS AND NEAR FIELD COMMUNICATION (NFC) DEVICE SUPPORTING NFC FUNCTION AND METHOD OF PERFORMING AUTHENTICATION THEREOF CROSS-REFERENCE TO RELATED APPLICATIONS

(71) Applicant: Samsung Electronics Co., Ltd., Suwon-si (KR)

(72) Inventors: Jae-in Lee, Suwon-si (KR); Dae-hyun Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/228,904

(22) Filed: Mar. 28, 2014

(65) Prior Publication Data

US 2015/0029532 A1    Jan. 29, 2015

(30) Foreign Application Priority Data

Jul. 29, 2013 (KR) .................. 10-2013-0089827

(51) Int. Cl.
G06K 15/00  (2006.01)
G06F 3/12   (2006.01)
H04W 12/00  (2009.01)

(52) U.S. Cl.
CPC ............ *G06F 3/1238* (2013.01); *G06F 3/1222* (2013.01); *G06F 3/1292* (2013.01); *H04W 12/00* (2013.01)

(58) Field of Classification Search
USPC .................................................. 358/1.14, 1.1
See application file for complete search history.

(56) References Cited

U.S. PATENT DOCUMENTS

| | | | |
|---|---|---|---|
| 2006/0046691 A1* | 3/2006 | Nishio | 455/410 |
| 2008/0201771 A1 | 8/2008 | Ueda | |
| 2009/0033984 A1* | 2/2009 | Sahashi | 358/1.15 |
| 2011/0162036 A1* | 6/2011 | Heo | 726/1 |

FOREIGN PATENT DOCUMENTS

| | | |
|---|---|---|
| JP | 2008-204204 | 9/2008 |
| KR | 10-2008-0050134 | 6/2008 |
| KR | 10-2011-0074027 | 6/2011 |

* cited by examiner

*Primary Examiner* — Martin Mushambo
(74) *Attorney, Agent, or Firm* — Jefferson IP Law, LLP

(57) ABSTRACT

An image forming apparatus for authenticating a near field communication (NFC) device, which receives information about an application being executed on an NFC device when the NFC device is tagged, determines an authentication method based on the received information, receives and authenticates a log in information corresponding to the determined authentication method from the NFC device, and allows the use of the image forming apparatus based on a result of authentication.

17 Claims, 17 Drawing Sheets

<Authentication Profile 1>

801

| Application type | Authentication type | Function |
|---|---|---|
| NFC app 1 | PIN type | Scan, Copy, Print |
| NFC app 2 | ID/PW type | Fax |
| NFC app 3 | PIN type or ID/PW type | Print |
| ... | ... | |

NFC tag

| Item | Value |
|---|---|
| Device Name | CLX-4170FW |
| Serial Number | 1234567890 |
| Print Capacity | Color, Mono |
| Scan Capacity | 300, 600 dpi |
| Fax Capacity | 33.6K bps |
| Network Address 1 | 0x0000f0a01234 |
| Network Address 2 | 169.254.12.13 |
| Location | N37.578868, E126.980564 |
| Administrator | Kim Jin Hyung (010-123-1234, j.h.Kim@samsung.com) |

<Authentication Profile 1>

| Application type | Authentication type | Function |
|---|---|---|
| NFC app 1 | PIN type | Scan, Copy, Print |
| NFC app 2 | ID/PW type | Fax |
| NFC app 3 | PIN type or ID/PW type | Print |
| ... | ... | |

FIG. 10

<Authentication Profile 2>   /1001

| Name | MAC address | Phone number | PIN | ID/PW | ... | Quota | Accounting |
|---|---|---|---|---|---|---|---|
| J. H. Kim | 00:00:F0:A0:12:34 | +82-10-1215-9528 | 0213 | tiger55 / 0001 | ... | unlimited | $250 |
| Jane Doe | 00:AB:CD:56:78:90 | N/A | 0552 | N/A | ... | Color; A4 30 page; tray 1 | $80 |
| NFC device 1 | 00:C8:F0:A0:12:00 | +82-10-2132-1923 | N/A | happy83 / 9999 | ... | unlimited | N/A |
| NFC device 2 | 00:28:CD:56:33:90 | +82-10-1111-2222 | 0012 | samsung81 / 9900 | ... | unlimited | N/A |
| ... | ... | ... | ... | ... | ... | ... | ... | ically, commercialized electronic devices, such as smartphones and personal computers (PCs), in which the NFC technology is used, have recently been released.

IMAGE FORMING APPARATUS AND NEAR FIELD COMMUNICATION (NFC) DEVICE SUPPORTING NFC FUNCTION AND METHOD OF PERFORMING AUTHENTICATION THEREOF CROSS-REFERENCE TO RELATED APPLICATIONS

This application claims the priority benefit of Korean Patent Application No. 10-2013-0089827, filed on Jul. 29, 2013, in the Korean Intellectual Property Office, the disclosure of which is incorporated herein in its entirety by reference.

BACKGROUND

1. Field

One or more embodiments relate to an image forming apparatus and a near field communication (NFC) device supporting an NFC function and a method of performing authentication in the image forming apparatus and the NFC device.

2. Description of the Related Art

Near field communication (NFC) is a contactless short-range wireless communication standard between electronic devices within a short distance of 10 cm with low power consumption by using a frequency of 13.56 MHz, and was developed by the joint work of NXP Semiconductors of the Netherlands and Sony of Japan in 2002. A data transfer rate of NFC is 424 Kbps, and NFC has excellent security due to high proximity and encryption technology. NFC forgoes a complicated pairing process of recognition of devices but allows devices to recognize one another within 1/10 second or less. In particular, NFC is a smart card type contactless wireless communication technology where radio frequency identification (RFID) technology is utilized. In addition, NFC builds upon RFID technology by allowing two-way communication compared to smart cards. NFC has a relatively large memory storage space and offers more variety of services. Accordingly, commercialized electronic devices, such as smartphones and personal computers (PCs), in which the NFC technology is used, have recently been released.

SUMMARY

In an aspect of one or more embodiments, there is provided an image forming apparatus which supports a near field communication (NFC) function and a method of performing authentication in the image forming apparatus and the NFC device.

One or more embodiments may include a computer readable recording medium having a program for executing the method.

Additional aspects will be set forth in part in the description which follows and, in part, will be apparent from the description, or may be learned by practice of embodiments.

In an aspect of one or more embodiments, there is provided an image forming apparatus for authenticating an external near field communication (NFC) device, the image forming apparatus includes: an NFC module to receive an application identification of an application being executed on an NFC device when the NFC device is tagged; and a control unit to determine an authentication method corresponding to the application based on the received application identification, wherein the control unit authenticates log in information corresponding to the determined authentication method, received from the NFC device via the NFC module, and allows use of the image forming apparatus based on a result of authentication.

The received application identification may include information used to identify an authentication method that is executable via the application.

The image forming apparatus may further include a storage unit in which authentication profiles for managing executable authentication methods according to types of applications are stored in advance, wherein the control unit determines an authentication method designated for the application by comparing the received application identification and the stored authentication profile.

The NFC module may transmit information about the determined authentication method to the NFC device.

The image forming apparatus may further include a storage unit in which authentication profiles for managing log in information regarding users or NFC devices who or which are allowed to use the image forming apparatus are stored in advance, wherein the control unit determines an authentication method designated for the application by comparing the received application identification and the stored authentication profile.

The image forming apparatus may further include: a user interface unit to receive a list of applications to be updated in an authentication profile or a user set up regarding log in information; and a storage unit to store an authentication profile that is updated according to the received user set up.

The image forming apparatus may support an authentication method using a smart card, an authentication method using an identification (ID)/password (PW), and an authentication method using a personal identification number (PIN), wherein the authentication regarding the NFC device is performed by using at least one of the authentication method using an ID/PW and the authentication method using a PIN.

The control unit may allow a user corresponding to the log in information or the tagged NFC device to use the image forming apparatus.

In an aspect of one or more embodiments, there is provided a near field communication (NFC) device for authenticating an image forming apparatus, the near field communication device includes: a control unit to execute an application that conducts an authentication operation via NFC; and an NFC module, when the image forming apparatus is tagged, to receive information about an authentication method corresponding to the executed application from the image forming apparatus, and to transmit log in information corresponding to the authentication method to the image forming apparatus, wherein the control unit provides a result of authentication of the log in information transmitted from the image forming apparatus and received from the image forming apparatus via the NFC module, via the application.

The executed application may be an application that has a function of controlling an image forming function of the image forming apparatus when the authentication operation via NFC is completed.

The NFC module may transmit an application identification regarding the executed application to the image forming apparatus, and receive information about the authentication method determined in the image forming apparatus based on the transmitted application identification.

At least one application that conducts different types of authentications may be installed in the NFC device, wherein the transmitted application identification includes information for identifying an authentication method that is executable via the application.

The NFC device may further include a user interface unit that provides a log in screen corresponding to the authentication method on the application, wherein the NFC module transmits the log in information input via the log in screen.

The user interface unit may provide a log in screen in which log in information input fields corresponding to a plurality of authentication methods are provided on different tabs or on a single tab, wherein on the log in screen, only log in information input fields corresponding to the received authentication method are activated.

The NFC module may transmit log in information that is stored by a user in advance, to at least one of a storage unit included in the NFC device or an external server.

In an aspect of one or more embodiments, there is provided a method of authenticating an external near field communication (NFC) device in an image forming apparatus, the method includes: receiving an application identification regarding an application being executed on an NFC device when the NFC device is tagged; determining an authentication method corresponding to the application based on the received application identification; receiving log in information corresponding to the determined authentication method from the NFC device; and allowing to use the image forming apparatus by authenticating the NFC device by using the received log in information.

The received application identification may include information to identify an authentication method that is executable via the application.

In an aspect of one or more embodiments, there is provided a method of authenticating an external near field communication (NFC) device to an image forming apparatus, the method includes: executing an application that conducts an authentication operation via NFC; receiving information about an authentication method corresponding to the executed application from the image forming apparatus when the image forming apparatus is tagged; transmitting log in information corresponding to the authentication method from the image forming apparatus; and providing a result of authentication by using the log in information transmitted from the image forming apparatus, via the application.

The method may further include transmitting an application identification of the executed application to the image forming apparatus, wherein the receiving of information about the authentication method includes receiving information about the authentication method determined in the image forming apparatus based on the transmitted application identification.

According to one or more embodiments, a non-transitory computer readable recording medium having embodied thereon a program for executing the method of one of claims described above is included.

According to an aspect of one or more embodiments, there is provided at least one non-transitory computer readable medium storing computer readable instructions to implement methods of embodiments.

BRIEF DESCRIPTION OF THE DRAWINGS

These and/or other aspects will become apparent and more readily appreciated from the following description of embodiments, taken in conjunction with the accompanying drawings of which:

FIG. 10 illustrates an authentication profile for managing log-in information, according to an exemplary embodiment;

DETAILED DESCRIPTION

Figure 1A:
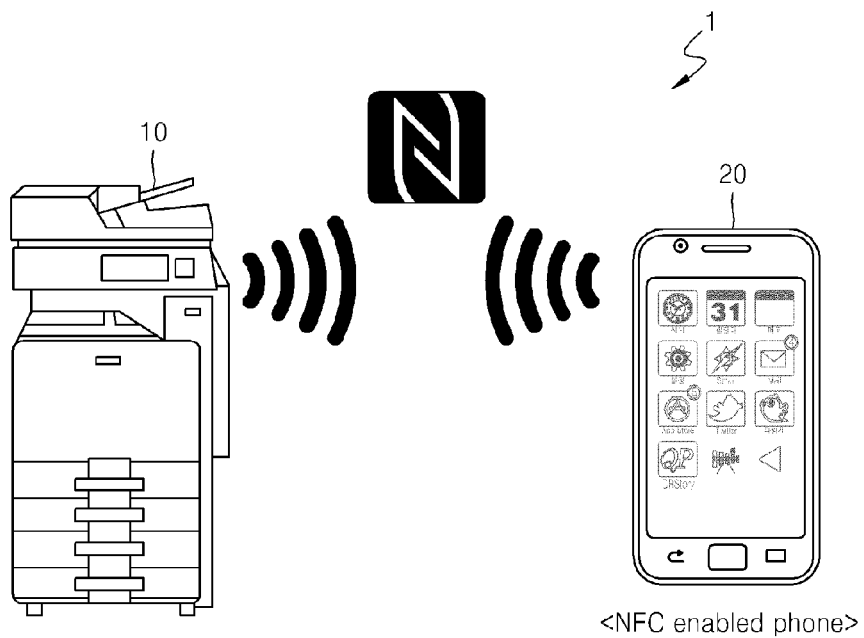
FIG. 1A illustrates a near field communication (NFC) environment according to an exemplary embodiment.

Reference will now be made in detail to embodiments, examples of which are illustrated in the accompanying drawings, wherein like reference numerals refer to the like elements throughout. Embodiments are described below while referring to the figures. Expressions such as "at least one of," when preceding a list of elements, modify the entire list of elements and do not modify the individual elements of the list.

FIG. 1A illustrates a near field communication (NFC) environment 1 according to an exemplary embodiment. Referring to FIG. 1A, an image forming apparatus 10 and an NFC device 20 each supporting an NFC function are present in the NFC environment 1. An NFC chip is embedded in the image forming apparatus 10 illustrated in FIG. 1 in advance, and thus communication between the image forming apparatus 10 and the mobile device 20 may be performed via NFC. The NFC device 20 may be, for example, a mobile device such as a smartphone, a tablet device, or a personal digital assistant (PDA).

Figure 1B:
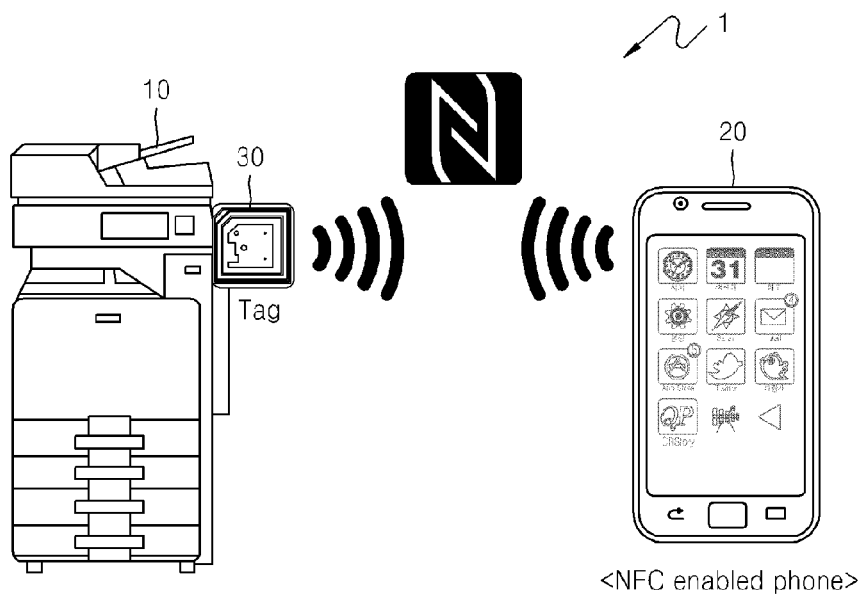
FIG. 1B illustrates an NFC environment which is similar to that of FIG. 1A, according to an exemplary embodiment.

FIG. 1B illustrates an NFC environment 1 which is similar to the NFC environment 1 FIG. 1A, according to an exemplary embodiment. Referring to FIG. 1B, an image forming apparatus 10 and a mobile device 20 each supporting an NFC function are also present in the NFC environment 1. In particular, an NFC tag 30 is embedded in advance in the image forming apparatus 10 of FIG. 1A, whereas no NFC tag 30 is embedded in the image forming apparatus 10 in FIG. 1B in advance. Accordingly, the image forming apparatus 10 of FIG. 1B may communicate with the mobile device 20 via NFC only when an NFC tag 30 is installed later in the image forming apparatus 10 of FIG. 1B.

However, it will be understood by one of ordinary skill in the art that if an NFC tag 30 is installed later in the image forming apparatus 10 of FIG. 1B, then an operation of the NFC environment 1 of the current exemplary embodiment is identical to that of the NFC environment 1 of FIG. 1A, in which the NFC tag 30 is embedded in advance.

While just one pair of devices, that is, the image forming apparatus 10 and the mobile device 20, is present in the NFC environment 1 illustrated in FIGS. 1A and 1B for convenience of description, more electronic devices of different types that support an NFC function may also be present in the NFC environment 1. These devices may also operate in the same manner of NFC as in the current exemplary embodiment, which would be understood by one of ordinary skill in the art.

Figure 1C:
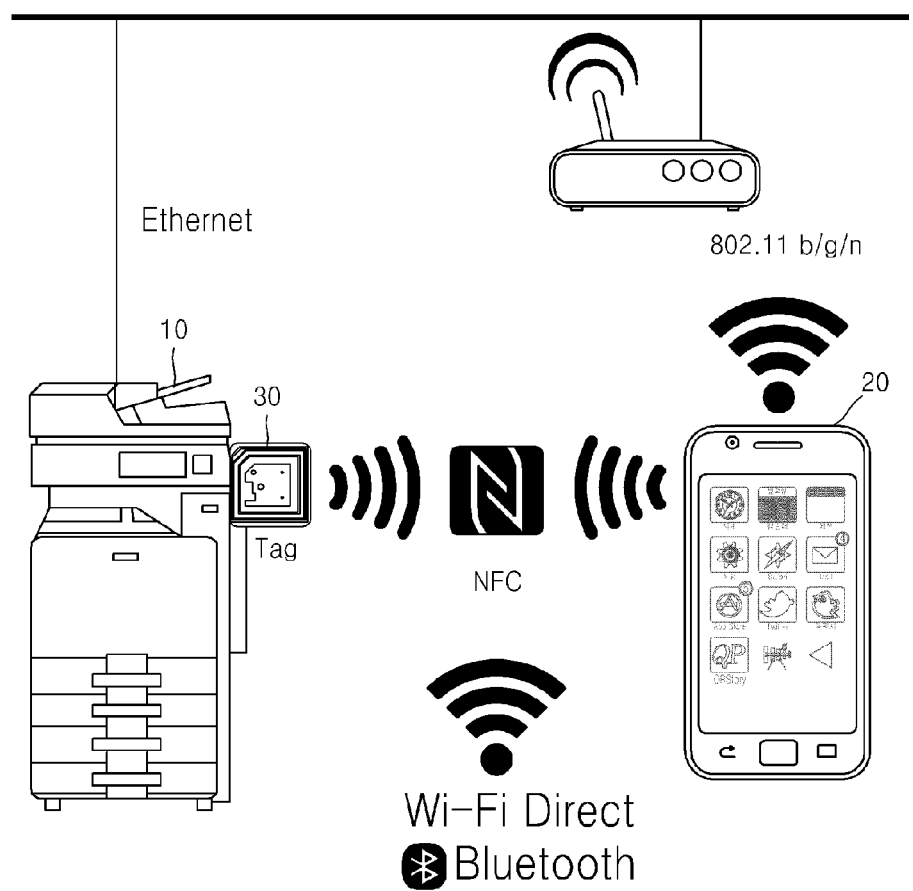
FIG. 1C illustrates a wireless communication environment in which an image forming apparatus and a user device are present, according to an exemplary embodiment.

FIG. 1C illustrates an alternative wireless communication environment 2 according to an exemplary embodiment, in which an image forming apparatus 10 and a mobile device 20 are present. Referring to FIG. 1C, other peripheral wired/wireless networks are illustrated in addition to the NFC environment 1 of FIG. 1A or 1B. The NFC environment 1 may operate in combination with peripheral wired/wireless networks, such as Wi-Fi Direct, Bluetooth, Ethernet, 802.11a/b/g/n, etc.

Before describing exemplary embodiments in detail, NFC technology will be described.

NFC is a contactless short-range wireless communication standard between electronic devices within a short distance of 10 cm with low power consumption by using a frequency of 13.56 MHz. A data transfer rate of NFC is 424 Kbps, and NFC has excellent security due to high proximity and encryption technology. NFC forgoes a complicated pairing process of recognition of devices but allows devices to recognize one another within 1/10 second or less. In particular, NFC is a smart card type contactless wireless communication technology where radio frequency identification (RFID) technology is utilized. In addition, NFC builds upon RFID technology by allowing two-way communication whereas conventional smart cards only allow one-way communication. Furthermore, NFC has a relatively large memory storage space and offers more variety of services.

In detail, NFC is a wireless communication method in which data is directly exchanged between terminals, for example, between the image forming apparatus 10 and the mobile device 20, without using a communication network, and is a type of RFID method. A wireless communication method using RFID may be classified according to frequencies used. For example, RFID at 13.56 MHz is mainly used for smart cards, such as transit cards or entrance cards, and RFID at 900 MHz is used mainly for logistics. NFC corresponds to RFID which, like smartcards, uses a frequency of 13.56 MHz. However, unlike smartcards, which allow only one-way communication, NFC allows two-way communication. Accordingly, NFC is different from smart cards, which function merely as a tag that stores particular information and transmit the same to a reader. NFC allows a tag function according to necessity but also supports a function of recording information on the tag, and may be used in peer to peer (P2P) data exchange between terminals in which NFC is set.

Figure 2A:
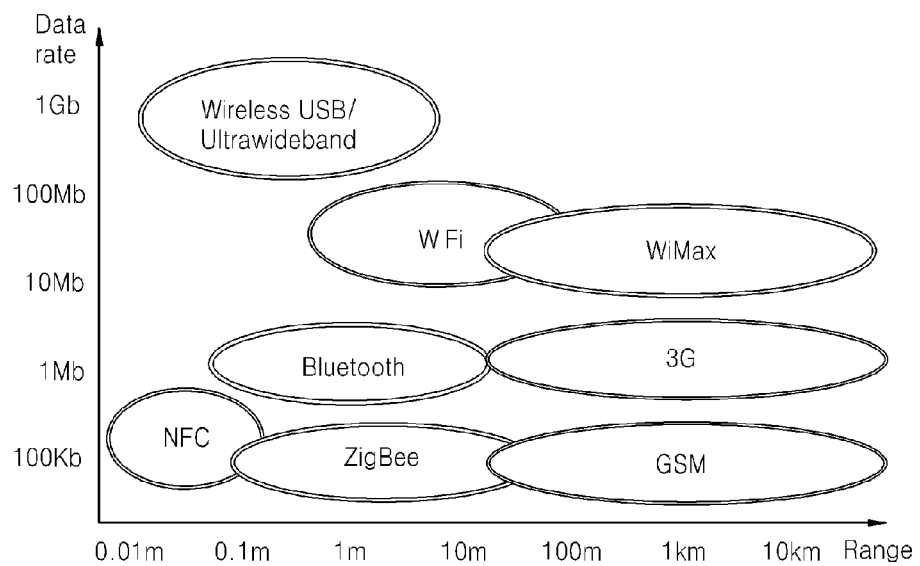
FIG. 2A is a graph comparing data rates and communication ranges of NFC and other wireless communication methods.

NFC which is developed based on RFID may be compared with other wireless communication methods, such as Wi-Fi Bluetooth, ZigBee, etc., as illustrated in FIG. 2A.

FIG. 2A is a graph comparing data rates and communication ranges of NFC and other wireless communication methods. Referring to FIG. 2A, compared to other wireless communication methods, NFC may operate at a distance within about 10 cm. Unlike Bluetooth or Wi-Fi etc., which allow communication in about several to several tens of meters, NFC allows communication only within an extremely short distance (about 10 cm).

In addition, NFC may be compared to other wireless communication methods, such as Bluetooth, ZigBee, etc., as described in Table 1 below.

TABLE 1

| Technology | Frequency used | Security | Standard range | Major service area |
|---|---|---|---|---|
| NFC | 13.56 MHz | Encryption is applied | International Standard | contactless payment, RFID, file transmission |
| Bluetooth | 2.4 GHz | N/A | International Standard | file transmission |
| ZigBee | 2.4 GHz | N/A | International Standard | device control, RFID |
| 900 MHz RFID | 900 MHz | N/A | Korean standard | RFID |

In other words, compared to other wireless communication methods, NFC operates only within a distance of 10 cm and encryption technology is applied thereto, and thus, a security level of NFC is high. Accordingly, when used in combination with other high-speed wireless communication methods, such as 3G or Wi-Fi, communication between devices via NFC may be performed with a higher efficiency. For example, when NFC and Bluetooth technology are combined, NFC may be used in connecting terminals (authorization) and Bluetooth may be used in data transmission between the terminals to thereby enable more efficient communication between the devices.

Figure 2B:
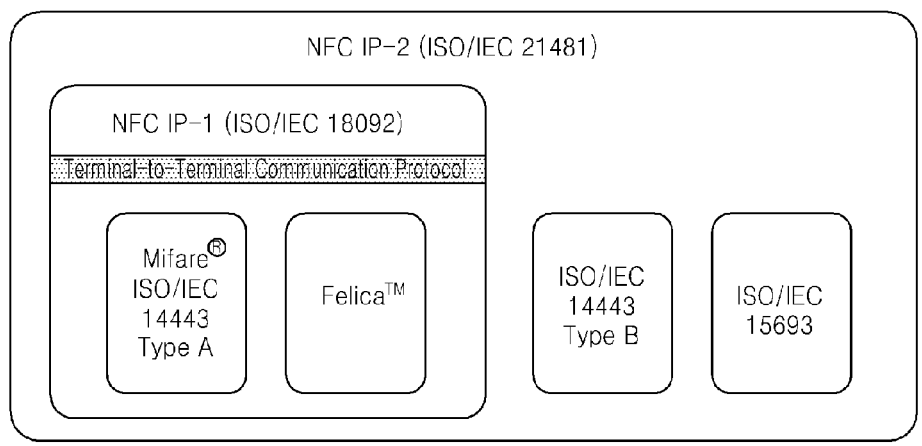
FIG. 2B is a view of standards related to NFC technology.

FIG. 2B is a view of standards related to NFC technology.

Referring to FIG. 2B, NFC standard technology follows International Organization for Standardization (ISO) and is also an extension of ISO 14443 Proximity-card Standard, and here, the inclusion relation of NFC IP-1 (NFC Interface Protocol-1)(ISO/IEC 18092) and NFC IP-2 (ISO/IEC 21481) is illustrated. Here, ISO/IEC 14443 Type A and Type B, FeliCa, and ISO/IEC 15693 are international standards of four areas of contactless cards operating at 13.56 MHz. Also, ISO/IEC 18092 defines communication modes for NFC interface and protocol.

Figure 3A:
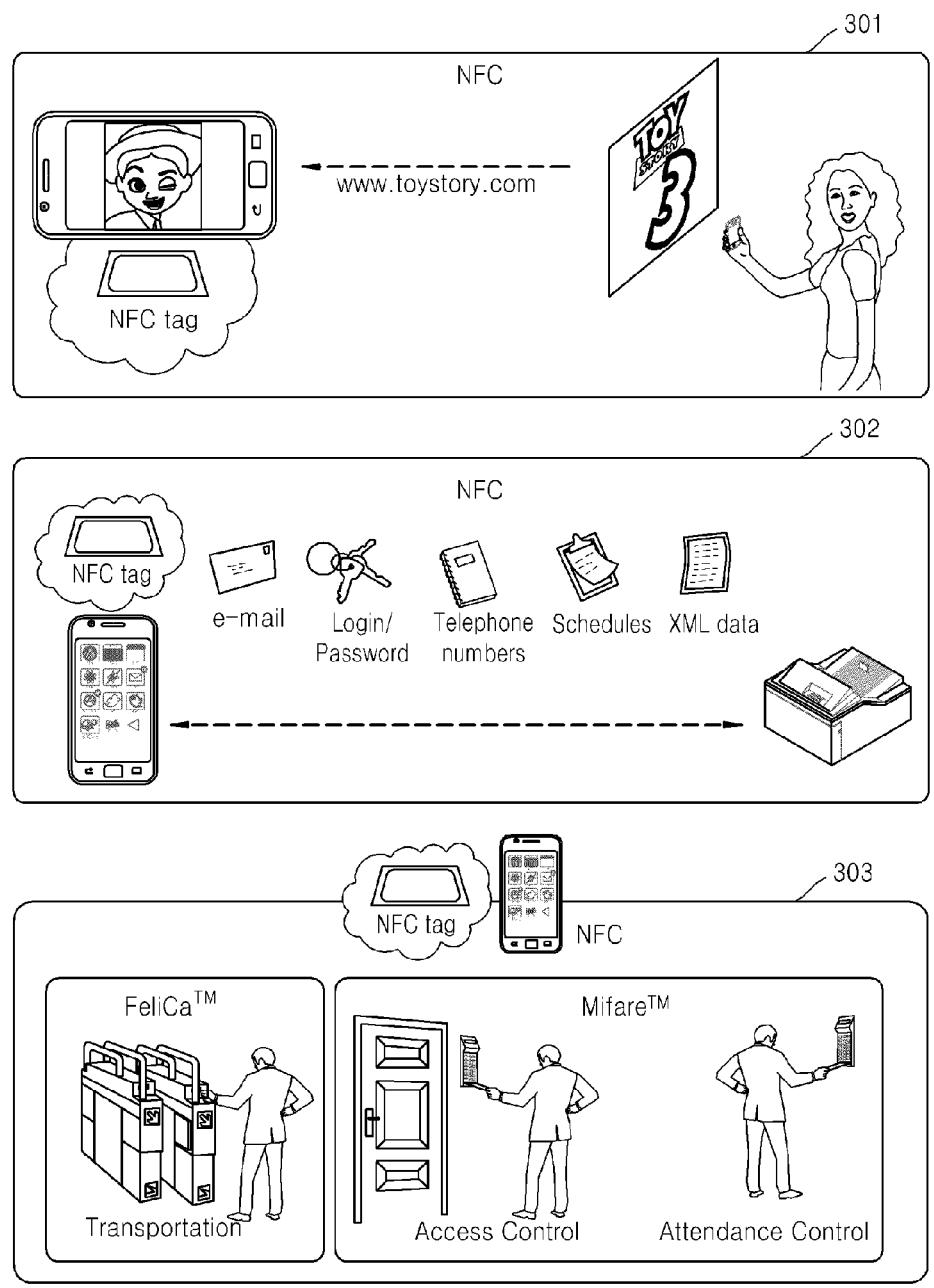
FIGS. 3A and 3B are diagrams to explain three communication modes of NFC.
Figure 3B:
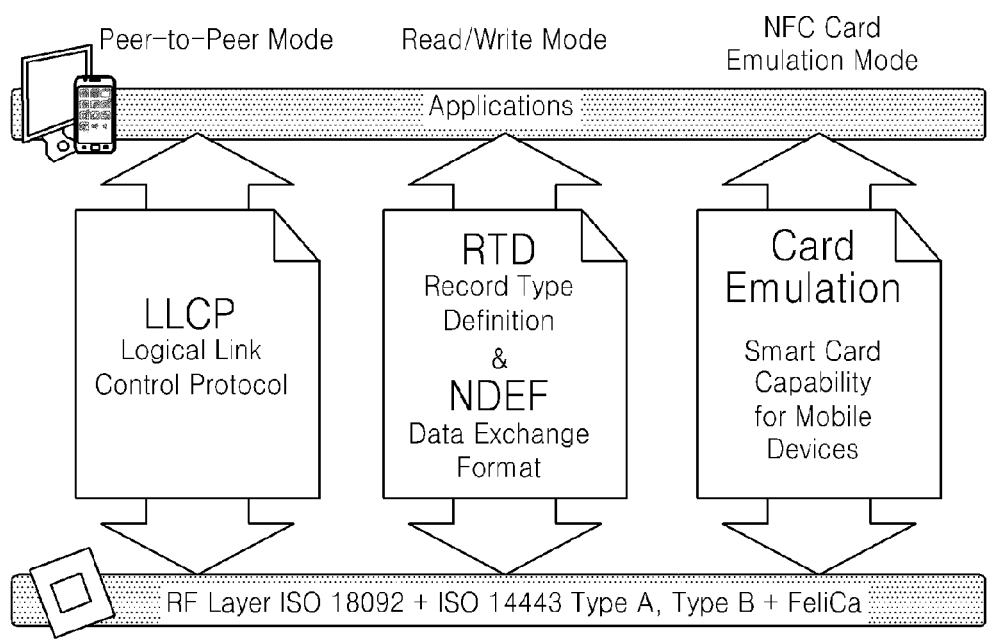

FIGS. 3A and 3B are diagrams to explain three communication modes of NFC.

Referring to FIG. 3A, the NFC Forum has standardized major NFC communication modes, which are a Reader/Writer mode 301, a P2P mode 302, and a Card Emulation mode 303. In sum, the three communication modes of NFC may be listed as in Table 2 below.

TABLE 2

|  | ISO/IEC 15693 | ISO/IEC 18092 | ISO/IEC 14443 |
|---|---|---|---|
| Operational mode | communication between reader and tag (VCD, Reader/Writer mode) | communication between devices (P2P mode) | communication between reader and tag (PCD, Card Emulation mode) |
| Power supply | Manual | active and manual | manual |
| Range of communication | 1 m | 10-20 cm | 10 cm |
| Data rate | 26 Kbps or less | 106 Kbps, 212 Kbps, 424 Kbps | 106 Kbps |

(PCD: Proximity Coupling Device, VCD: Vicinity Coupling Device)

First, the Reader/Writer mode 301 supports that the mobile device 20, in which an NFC tag 30 is embedded, operates as a reader for reading another NFC tag 30 or operates as a writer for inputting information to another NFC tag 30.

In the P2P mode 302, communication at a link level between two NFC terminals, for example, between the image forming apparatus 10 and the mobile device 20, is supported (ISO/IEC 18092). To establish a connection, a client (NFC P2P initiator, the mobile device 20) searches for a host (NFC P2P target, the image forming apparatus 10) and transmits data of an NDEF message format. In the P2P mode 302, data, such as emails, login/password information, schedules, telephone numbers, and XML data, may be exchanged just by touching the image forming apparatus 10 with the mobile device 20.

Finally, in the Card Emulation mode 303, the mobile device 20, in which an NFC tag 30 is embedded, operates as a smart card (ISO/IEC 14443). Accordingly, NFC is compatible not only with ISO 14443, which is the international standard for contactless cards, but also with FeliCa by Sony and MiFare by Philips.

In order to coordinately provide the three communication modes of NFC, a protocol is standardized as illustrated in FIG. 3B. Referring to FIG. 3B, a software structure in an NFC system is illustrated.

Logical Link Control Protocol (LLCP) is a protocol that sets a communication connection between layers and controls the same. An NFC Data Exchange Format (NDEF) message is a basic message structure defined in an NFC communication protocol. The NDEF is a standard exchange format for Uniform Resource Identifier (URI), smart posters, and others, which defines a recording format regarding message exchange between NFC Forum-compatible devices and tags. An NDEF message includes at least one NDEF record. The NDEF record includes a payload that is described according to type, length, and option identifiers. An NDEF payload refers to application data included in an NDEF record. Record Type Definition (RTD) defines a record type and a type name which may correspond to an NDEF record.

Figure 4:
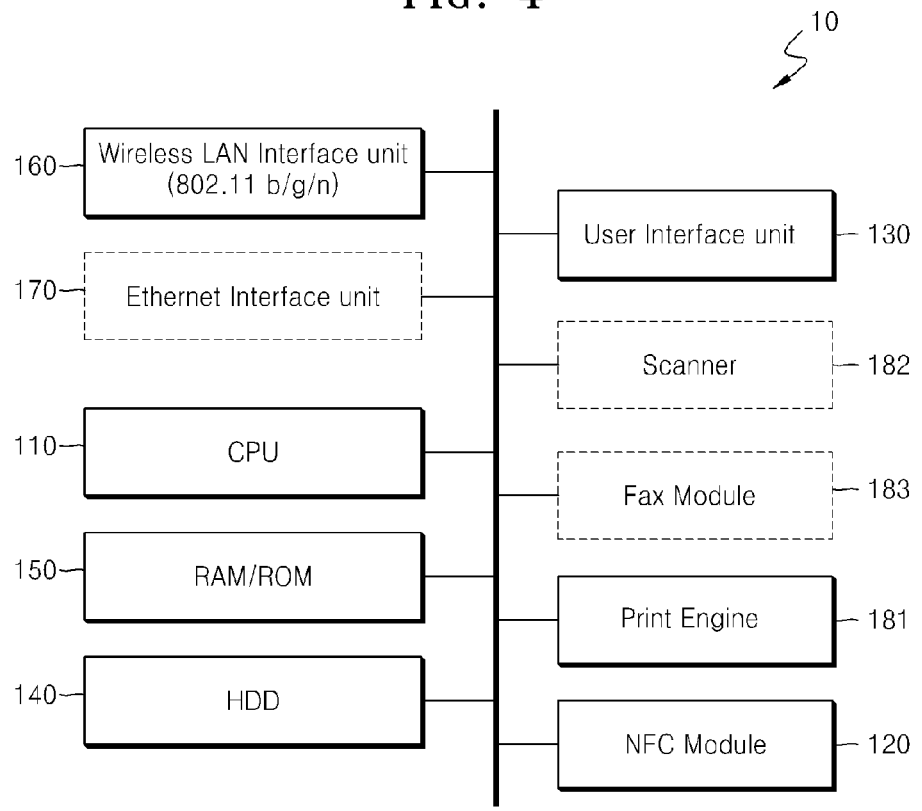
FIG. 4 is a block diagram illustrating a basic hardware structure of an image forming apparatus supporting an NFC function, according to an exemplary embodiment.

FIG. 4 is a block diagram illustrating a basic hardware structure of the image forming apparatus 10 supporting an NFC function, according to an exemplary embodiment. Referring to FIG. 4, the image forming apparatus 10 may include a central processing unit (CPU) 110, an NFC module 120, a user interface unit (user interface) 130, a hard disk drive (HDD) 140, a random access memory/read only memory (RAM/ROM) 150, a wireless local area network (WLAN) interface unit 160, an Ethernet interface unit 170, a print engine 181, a scanner 182, and a fax module 183. If the image forming apparatus 10 supports only WLAN, the Ethernet interface unit 170 may not be included. Also, if the image forming apparatus 10 is a printer, the scanner 182 and the fax module 183 may not be included.

The CPU 110 controls the overall operation of the image forming apparatus 10, and information needed for controlling and print data is stored in the HDD 140 and the RAM/ROM 150 and read therefrom when necessary.

The user interface unit 130 is hardware used as a medium for the user when the user checks information of the image forming apparatus 10 and inputs a command to the image forming apparatus 10. The user interface unit 130 may be designed in various manners according to products. For example, it may be formed in a simple form of two or four lines on a display, such as a liquid crystal display (LCD) or light emitting diode (LED), or as a graphic user interface (GUI), so as to enable various graphical representations.

The WLAN interface unit 160 refers to hardware that performs IEEE 802.11a/b/g/n functionality, and may communicate with a main board of the image forming apparatus 10 via a universal serial bus (USB) or the like. The WLAN interface unit 160 may also support Wi-Fi Direct at the same time.

The Ethernet interface unit 170 refers to hardware that performs wired Ethernet communication according to IEEE 802.3.

The print engine 181, the scanner 182, and the fax module 183 refer to hardware to perform a printing function, a scan function, and a fax function, respectively.

In particular, the image forming apparatus 10 includes the NFC module 120 to thereby communicate with other NFC devices, such as the mobile device 20, via NFC. The NFC module 120 is in charge of the NFC function and may data read from or write data to an NFC tag 30. Also, communication with the main board of the image forming apparatus 10 is performed by using a Universal Asynchronous Receiver/Transmitter (UART), an Inter Integrated Circuit (I2C), a Serial Peripheral Interface Bus (SPI), or the like (not illustrated). As described above with reference to FIGS. 1A and 1B, the NFC module 120 may be embedded in the image forming apparatus 10 in advance at the time of factory shipment, or may be available when the user installs the NFC tag 30 later.

Although not illustrated in FIG. 4, the image forming apparatus 10 may also include other wireless communication modules, such as a Bluetooth module or a ZigBee module.

Figure 5:
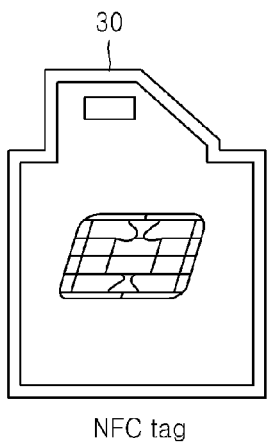
FIG. 5 illustrates an NFC tag and information stored in the NFC tag installed in the image forming apparatus of FIG. 1B.

FIG. 5 illustrates the NFC tag 30 installed in the image forming apparatus 10 of FIG. 1B and information 510 stored in the NFC tag 30. Referring to FIG. 5, in an example of the image forming apparatus 10 of FIG. 1B, the NFC function may be utilized when the NFC tag 30 is inserted into a slot (not illustrated) that is provided in advance in the image forming apparatus 10. The information 510 of the NFC tag 30, for example, performance information of the image forming apparatus 10, may be recorded by other NFC devices in the Reader/Writer mode 301 or may be stored in advance by a manager.

Hereinafter, detailed functions and operations for authenticating an NFC device 20 in an image forming apparatus 60 and detailed functions and operations for authenticating the NFC device 20 to the image forming apparatus 60 according to an embodiment will be described in detail with reference to the drawings below.

Figure 6:
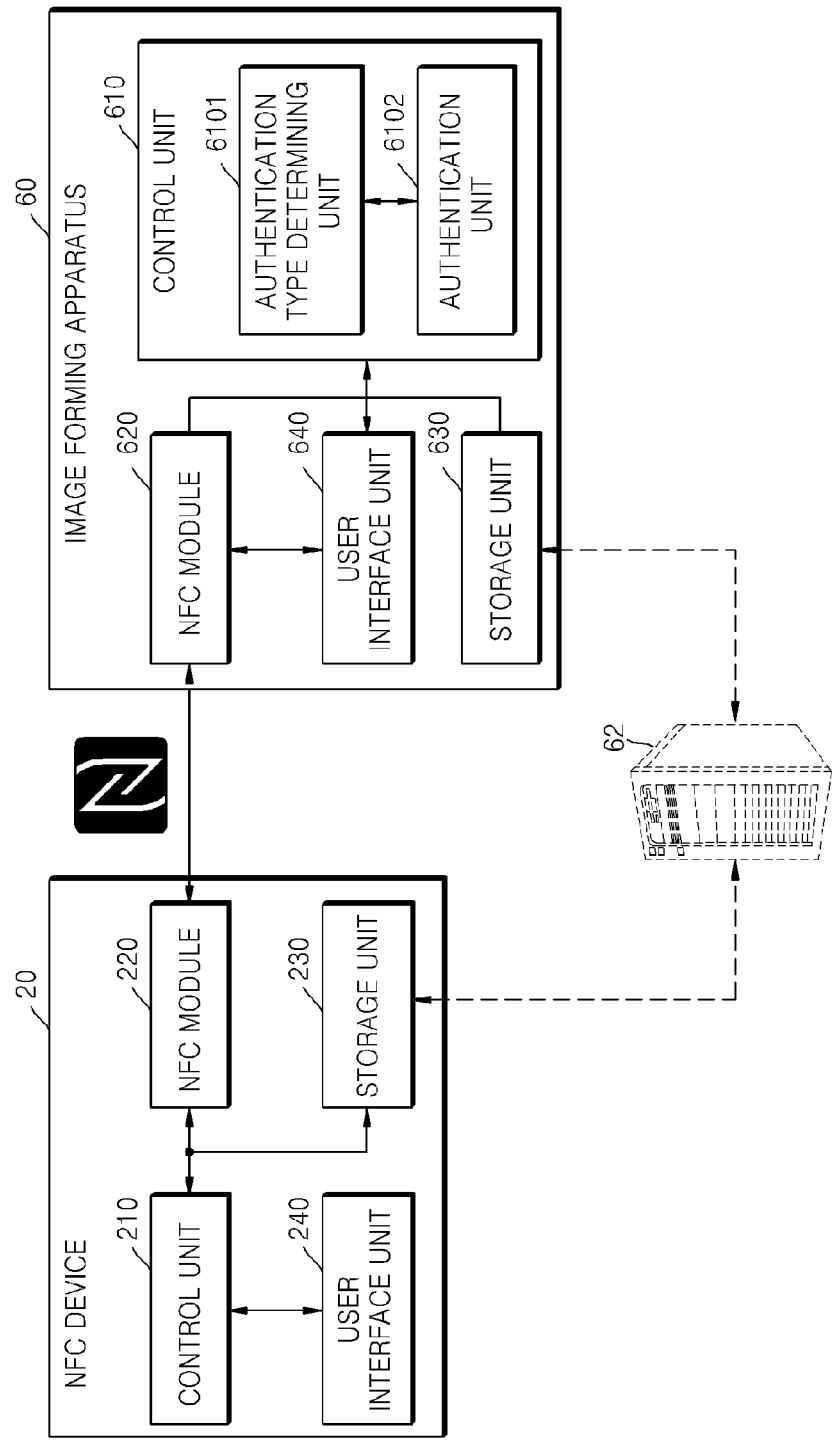
FIG. 6 is a block diagram illustrating a hardware configuration of an image forming apparatus and an NFC device that perform authentication, according to an exemplary embodiment.

FIG. 6 is a block diagram illustrating a hardware configuration of the image forming apparatus 60 and the NFC device 20 that perform authentication, according to an embodiment.

In FIG. 6, only hardware components related to an exemplary embodiment will be described in order not to obscure the characteristics of the current exemplary embodiment. However, it will be understood by one of ordinary skill in the art that general-use hardware components other than the illustrated hardware components in FIG. 6 may also be included.

Referring to FIG. 6, the image forming apparatus 60 is illustrated as including just hardware components related to the current exemplary embodiment from among the hardware components of the image forming apparatus 10 illustrated in FIG. 4. However, it will be understood by one of ordinary skill in the art that elements that are omitted in FIG. 6 but described with reference to the image forming apparatus 10 of FIG. 4 may also be applied to the image forming apparatus 60.

The image forming apparatus 60 includes a control unit (controller) 610, an NFC module 620, a storage unit 630, and a user interface unit (user interface) 640. The control unit 610 includes an authentication type determining unit 6101 and an authentication unit 6102. In FIG. 6, the control unit 610 corresponds to the CPU 110 of FIG. 4, and the NFC module 620 corresponds to the NFC module 120 of FIG. 4, the storage unit 630 corresponds to the HDD 140 of FIG. 4, and the user interface unit 640 corresponds to the user interface unit 130 of FIG. 4.

The NFC device 20 includes a control unit (controller) 210, an NFC module 220, a storage unit 230, and a user interface unit (user interface) 240.

Before the NFC device 20 tries authentication to the image forming apparatus 60, a user executes an NFC authentication application which is installed in the NFC device 20 in advance. The NFC authentication application in the NFC device 20 performs an authentication operation via NFC, and has a function of controlling an image forming function of the image forming apparatus 60 when the authentication operation via NFC is completed.

That is, the control unit 210 of the NFC device 20 executes the NFC authentication application to activate the NFC function of the NFC module 220 of the NFC device 20 so that the NFC device 20 prepares to try authentication.

The NFC module 620 of the image forming apparatus 60 recognizes access of the NFC device 20 according to an NFC protocol. In order to activate the NFC function and establish a connection, a predetermined NFC device 20 corresponding to a client has to access the image forming apparatus 60 corresponding to a host, within a proximity range of 10 cm.

Accordingly, the NFC module 620 tags the NFC device 20 by recognizing the access of the NFC device 20.

Then, as described above, the NFC module 620 receives an NDEF message defined according to the NFC standards from the NFC device 20, and also receives an application identification (application identifier) (ID) of an application being executed on the NFC device 20, included in the NDEF message.

The application ID includes information for identifying an authentication method that is executable via the NFC authentication application installed in the NFC device 20, and may include different information according to types of the NFC authentication application.

Figures 7, 8:
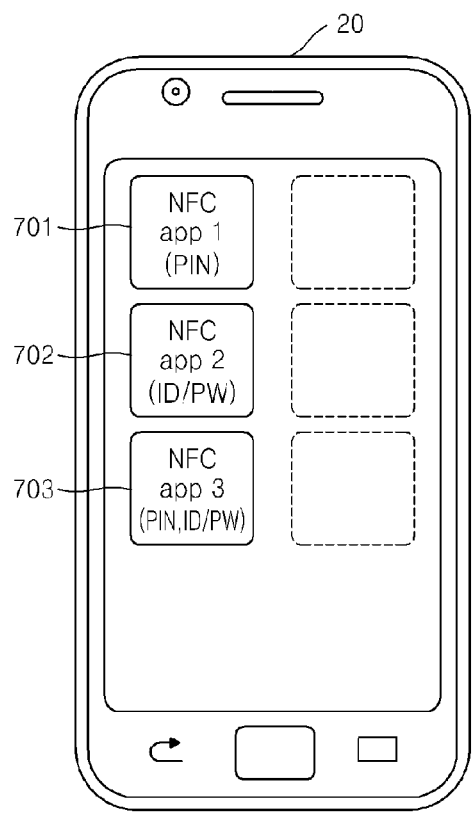
FIG. 7 is a diagram for explaining various types of NFC authentication applications installed in an NFC device, according to an exemplary embodiment.
FIG. 8 illustrates an authentication profile for managing authentication methods, according to an exemplary embodiment.

FIG. 7 is a diagram for explaining various types of NFC authentication applications 701, 702, and 703 installed in an NFC device 20, according to an embodiment.

Referring to FIG. 7, in the NFC device 20, an NFC application 1 (NFC app 1) 701 using a personal identification number (PIN) authentication method, an NFC application 2 (NFC app 2) 702 using an identification/password (ID/PW) authentication method, and an NFC application 3 (NFC app 3) 703 using the authentication methods using a PIN and ID/PW may be installed. However, while three NFC applications 701, 702, and 703 are described as being installed in the NFC device 20, embodiments are not limited thereto, and at least one NFC application may be installed.

When the NFC application 1 701 is executed on the NFC device 20, authentication cannot be performed using the ID/PW authentication method. Also, when the NFC application 2 702 is executed on the NFC device 20, authentication cannot be performed using the PIN authentication method.

Accordingly, the application ID includes information regarding which authentication method is executable in an application that is currently being executed on the NFC device 20.

The NFC application 1 (NFC app1) 701, the NFC application 2 (NFC app 2) 702, and the NFC application 3 (NFC app 3) 703 have different authentication methods, and may also be applications for controlling different image forming functions of the image forming apparatus 60 (e.g., scanning, copying, faxing or printing).

Referring back to FIG. 6, the image forming apparatus 60 may determine an authentication method to be used in authentication by using the application ID.

First, examples of types of authentication methods that may be supported by the image forming apparatus 60 according to an embodiment include an authentication method using a smart card, an authentication method using ID/PW, and an authentication method using a PIN.

However, different authentication methods may be used according to types of the NFC device 20 and types of NFC authentication applications executed in the NFC device 20. As the NFC device 20 does not correspond to a smart card, an authentication method using a smart card among the authentication methods supported by the image forming apparatus 60 may not be applied to the NFC device 20.

The authentication type determining unit 6101 of the control unit 610 included in the image forming apparatus 60 determines an authentication method corresponding to an NFC authentication application that is currently being executed on the NFC device 20, based on an application ID received via the NFC module 620.

In detail, authentication profiles for managing executable authentication methods according to types of applications are previously stored in the storage unit 630 of the image forming apparatus 60.

FIG. 8 illustrates an authentication profile 801 for managing authentication methods, according to an embodiment.

Referring to FIG. 8, information indicating that an NFC application 1 (NFC app 1) uses a PIN authentication method, and an NFC application 2 (NFC app2) uses an ID/PW authentication method, and an NFC application 3 (NFC app 3) uses a PIN or ID/PW authentication method is stored in the storage unit 630 as the authentication profile 801 in advance.

However, it will be obvious to one of ordinary skill in the art that the authentication profile 801 of FIG. 8 is exemplary, and that is may also be converted to another type of table to managed.

Referring back to FIG. 6, the authentication type determining unit 6101 parses a type of an NFC authentication application indicated by the received application ID. Then, the authentication type determining unit 6101 compares the parsed type of the application and an authentication profile stored in the storage unit 630 to determine an authentication method that is designated for the parsed type of application.

The NFC module 220 of the NFC device 20 receives information about the determined authentication method, from the image forming apparatus 60.

The user interface unit 240 of the NFC device 20 provides a log-in screen on the NFC authentication application based on information regarding the received authentication method.

The user interface unit 240 may provide a log-in screen where log-in information input fields corresponding to a plurality of authentication methods are provided on different tabs or on a single tab.

Figure 9A:
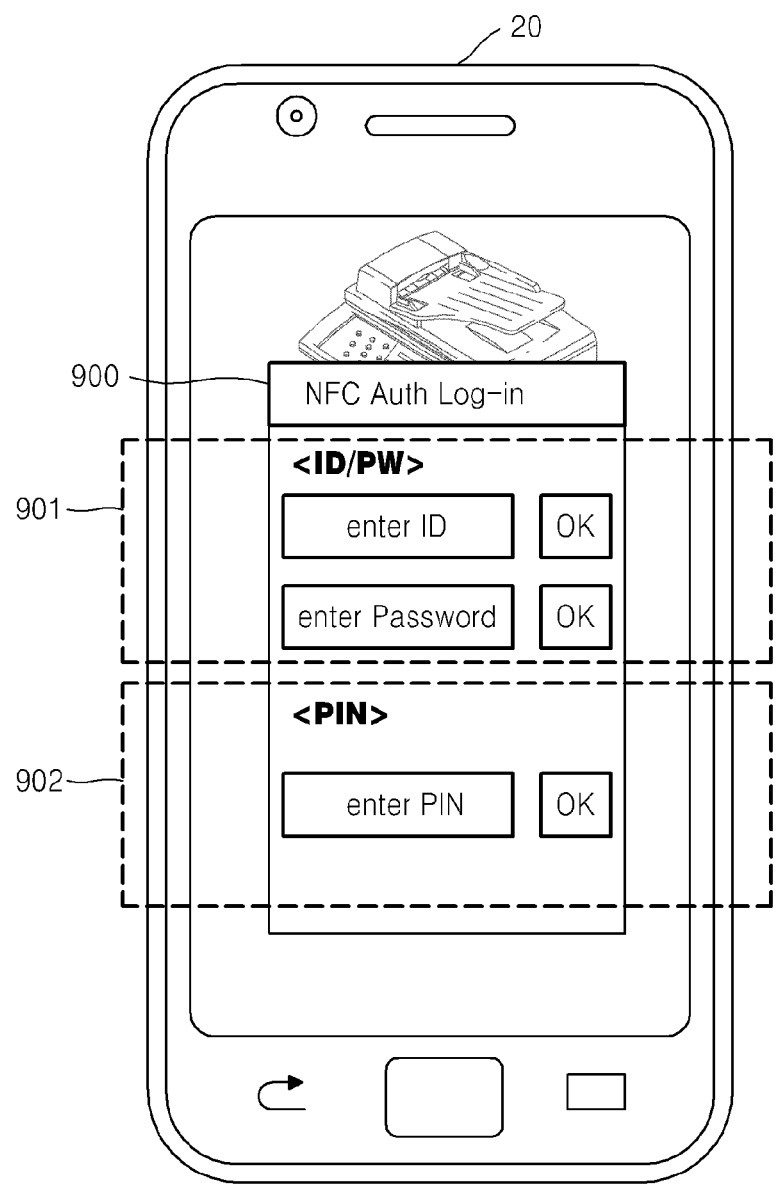
FIG. 9A illustrates a log-in screen displayed on a user interface unit of an NFC device, according to an exemplary embodiment.

FIG. 9A illustrates a log-in screen 900 displayed on a user interface unit 240 of an NFC device 20, according to an embodiment.

Referring to FIG. 9A, the user interface unit 240 of the NFC device 20 may display a log-in screen 900 as a pop-up window. If the determined authentication method received from the image forming apparatus 60 includes both an ID/PW authentication method and a PIN authentication method, a log-in information input field 901 corresponding to the ID/PW authentication method and a log-in information input field 902 corresponding to the PIN authentication method may be both activated and provided.

A user of the NFC device 20 may directly input log-in information to be authenticated, to the image forming apparatus 60 via the log-in screen 900 displayed on the user interface unit 240.

Figure 9B:
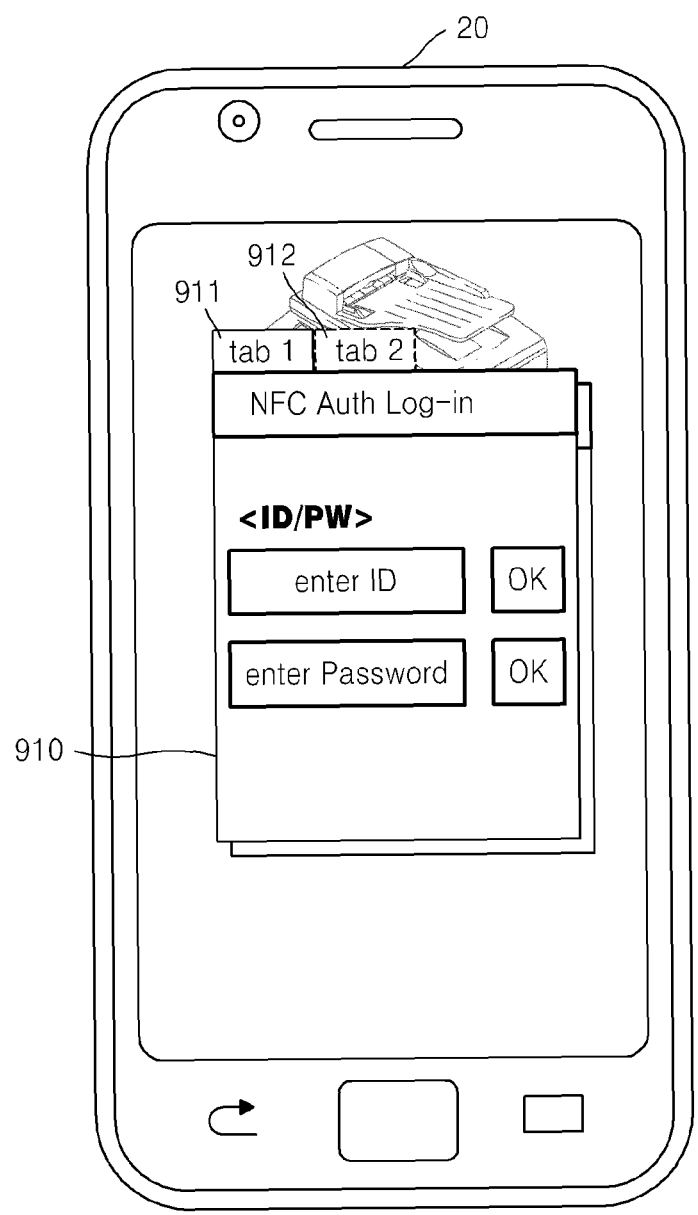
FIG. 9B illustrates a log-in screen displayed on a user interface unit of an NFC device, according to an exemplary embodiment.

FIG. 9B illustrates a log-in screen 910 displayed on a user interface unit 240 of an NFC device 20, according to an embodiment.

Referring to FIG. 9B, the user interface unit 240 of the NFC device 20 may display the log-in screen 910 as a pop-up window.

However, unlike the log-in screen 900 of FIG. 9A, the log-in screen 910 of FIG. 9B provides log-in information input fields corresponding to the ID/PW authentication method and the PIN authentication method on different tabs 1 and 2 911 and 912.

That is, when the user has clicked the tab 1 911 for the ID/PW authentication method, the user interface unit 240 displays log-in information input fields for inputting ID/PW. However, the user may click the tab 2 912 to display log-in information input fields for inputting a PIN.

The user of the NFC device 20 may directly input log-in information to be authenticated, to the image forming apparatus 60 via the tab 1 or 2 911 or 912 of the log-in screen 910 displayed on the user interface unit 240.

Figure 9C:
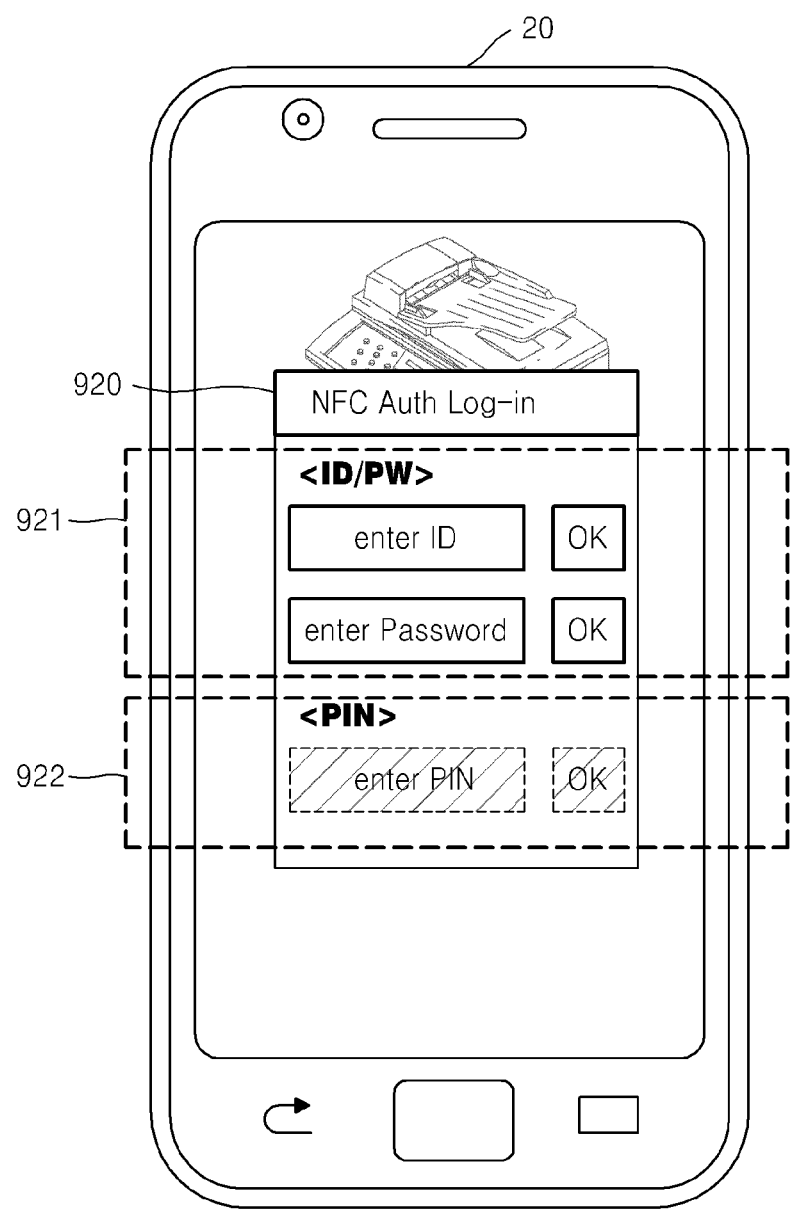
FIG. 9C illustrates a log-in screen displayed on a user interface unit of an NFC device, according to an exemplary embodiment.

FIG. 9C illustrates a log-in screen 920 displayed on a user interface unit 240 of an NFC device 20, according to an embodiment.

Referring FIG. 9, the user interface unit 240 of the NFC device 20 may display a log-in screen 920 as a pop up window. If the authentication method determined by the image forming apparatus 60 includes only an ID/PW authentication method and does not include a PIN authentication method, only a log in information input field 921 corresponding to the ID/PW authentication method is activated on the log in screen 920, and a log in information input field 922 corresponding to the PIN authentication method may be provided as inactivated.

That is, a user of the NFC device 20 may directly input log in information only into the log in information input field 921 corresponding to the ID/PW authentication method on the log in screen 920 displayed on the user interface unit 240, and on the log in information input field 922 corresponding to the PIN authentication method, log in information may not be input.

The log in screens 900, 910, and 920 illustrated in FIGS. 9A through 9C are exemplary and provided for convenience of description, and embodiments are not limited thereto and log in screens having other forms may also be provided.

Referring back to FIG. 6, the NFC module 220 of the NFC device 20 transmits log in information of a user to the image forming apparatus 60.

Log in information of the user may be, as described above, an ID/PW or a PIN that is directly input by a user via the log in screen 900, 910, or 920 of FIGS. 9A through 9C displayed on the user interface unit 240.

However, according to an embodiment, log in information of a user may be previously stored in the external server 62. That is, log in information of a user may be previously stored in the external server 62 such as a Remote Authentication Dial in User Service (RADIUS) server that performs authentication, authorization, and accounting. The RADIUS server is also known as an Authentication Authorization Accounting (AAA) server.

According to an embodiment, the NFC module 220 of the NFC device 20 may transmit not log in information input by a user, but log in information of a user stored in the external server 62, to the image forming apparatus 60.

That is, the log in information according to an embodiment may be information that is directly input by a user or information that is previously stored in the external server 62.

The authentication unit 6102 of the control unit 610 included in the image forming apparatus 60 authenticates log in information received from the NFC device 20 via the NFC module 620.

In detail, the storage unit 630 of the image forming apparatus 60 may store authentication profiles for managing log information regarding users or NFC devices who or which are allowed to use the image forming apparatus 60 in advance.

FIG. 10 illustrates an authentication profile 1001 for managing log-in information, according to an embodiment.

Referring to FIG. 10, the authentication profile 1001 includes log in information, contact information, usage limit information, accounting information or the like of users (J. H. Kim, Jane Doe, etc.) who are allowed to use the image forming apparatus 60. Also, the authentication profile 1001 includes log in information, contact information, usage limit information, accounting information or the like of NFC devices (NFC device 1, NFC device 2, etc.) which are allowed to use the image forming apparatus 60.

However, it will be obvious to one of ordinary skill in the art that the authentication profile 1001 of FIG. 10 is exemplary, and that it may also be modified to another type of table to manage the authentication profile 1001.

Referring back to FIG. 6, the authentication unit 6102 performs authentication by comparing log in information transmitted from the NFC device 20 with an authentication profile stored in the storage unit 630 in advance such as the authentication profile 1001 illustrated in FIG. 10.

For example, if log in information transmitted by the NFC device 20 is ID: tiger55/PW: 0001, the authentication unit 6102 may authenticate that a user of the log in information corresponds to user J. H. Kim. Alternatively, if log in information transmitted by the NFC device 20 ID: happy83/PW: 9999, the authentication unit 6102 may authenticate that a device of the log in information corresponds to a device NFC device 1.

When authentication is completed, the authentication unit 6102 may authorize use of the image forming apparatus 60 based on a result of authentication. That is, the authentication unit 6102 allows a predetermined user or a predetermined NFC device 20 that corresponds to the log in information used in the authentication, to use the image forming apparatus 60.

The NFC module 220 of the NFC device 20 receives a result of authentication of the authentication unit 6102, and the control unit 210 of the NFC device 20 provides the authentication result via an NFC authentication application. That is, the NFC device 20 provides the authentication result of the authentication unit 6102 via the NFC authentication application displayed on the user interface unit 240.

Consequently, the user may perform image forming operations (scanning, copying, faxing, or the like) in the image forming apparatus 60 via the NFC authentication application installed in a separate host PC (not shown) or the NFC device 20.

That is, authentication performed by using NFC device 20 in the image forming apparatus 60 may be for the NFC device 20 to use the image forming apparatus 60. Alternatively, authentication performed by using the NFC device 20 in the image forming apparatus 60 may be authentication performed first by tagging just the NFC device 20 before using the image forming apparatus 60 by using a separate host PC (not shown).

An authentication management application for managing setups regarding authentication or authentication profiles may be installed in the image forming apparatus 60 in advance. For example, the authentication management application may correspond to SyncThru Web Service® (SWS).

The authentication management application may be manipulated by a manager or a user of the image forming apparatus 60 via the user interface unit 640 or an embedded web UI (not shown).

Figure 11:
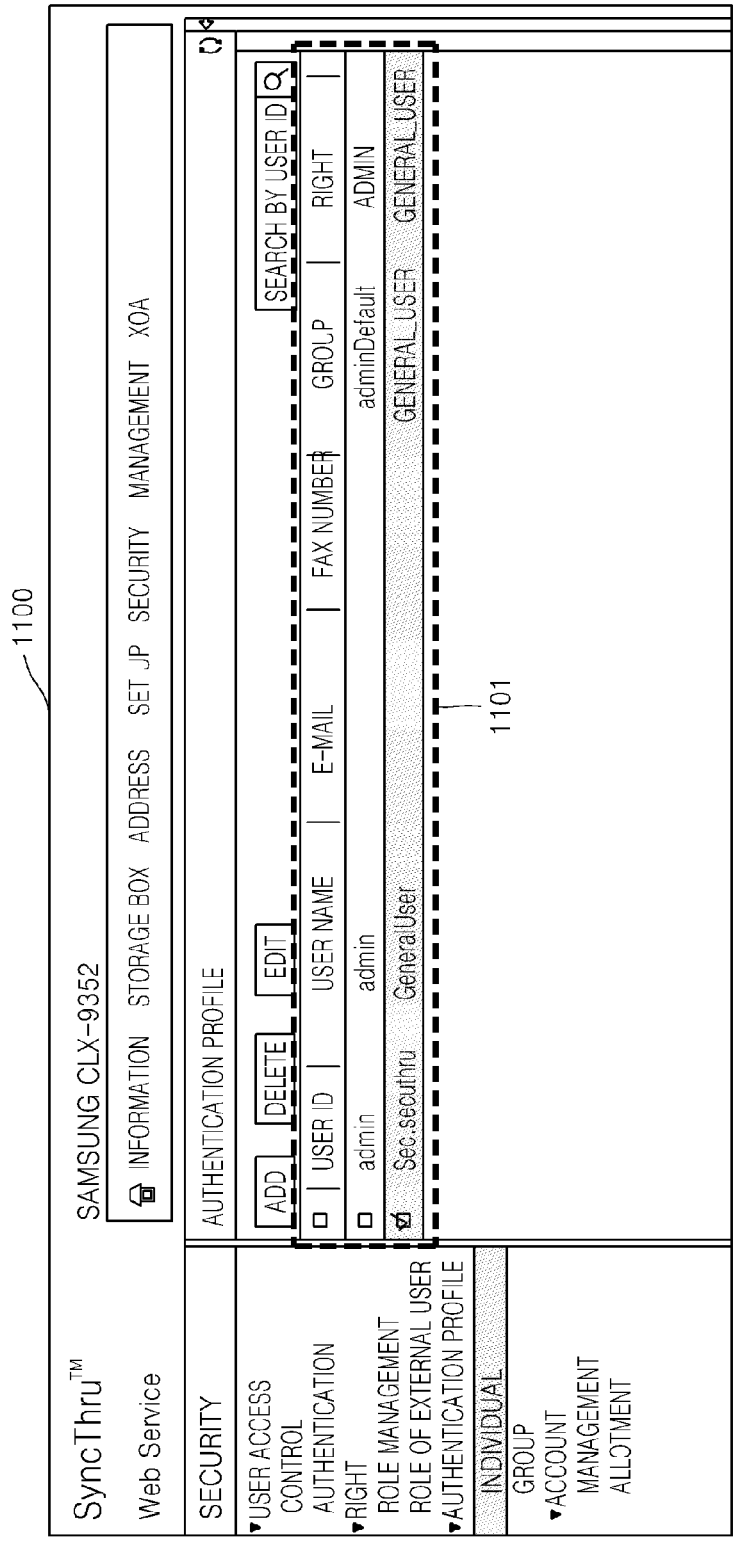
FIG. 11 illustrates a screen of an authentication management application for managing an authentication profile, according to an exemplary embodiment.

FIG. 11 illustrates a screen 1100 of an authentication management application for managing an authentication profile 1101, according to an embodiment.

Referring to FIG. 11, a manager or a user of the image forming apparatus 60 may manage the authentication profile 1101 via the authentication and management application displayed on a user interface unit 640 or an embedded web UI (not shown).

That is, the manager of the image forming apparatus 60 may set up information in the form such as the authentication profile 1001 illustrated in FIG. 10 or information such as the authentication profile 1101 illustrated in FIG. 11 via the screen 1100 of the authentication management application.

Figure 12:
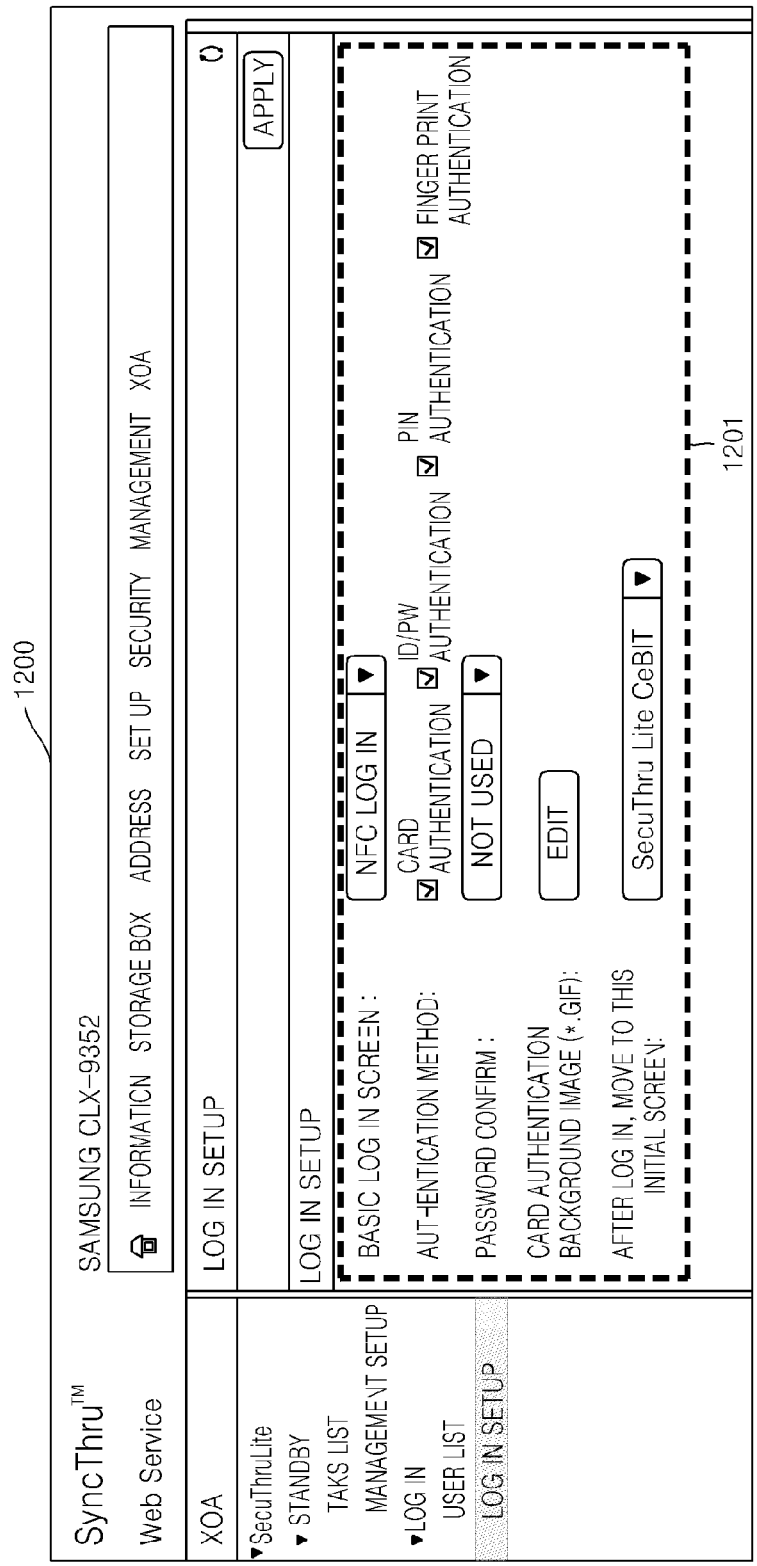
FIG. 12 illustrates a screen of an authentication management application for managing authentication set ups, according to exemplary embodiment.

FIG. 12 illustrates a screen 1200 of an authentication management application for managing authentication set ups 1201, according to an embodiment.

Referring to FIG. 12, a manager or a user of an image forming apparatus 60 may manage the authentication set ups 1201 via the screen 1200 of the authentication management application displayed on a user interface unit 640 or an embedded web UI (not shown).

In detail, the image forming apparatus 60 may set up supportable authentication methods in advance. That is, the image forming apparatus 60 may preset an authentication method using a smart card, an authentication method using an ID/PW, or an authentication method using a PIN, via the screen 1200 of the authentication management application.

The authentication via the NFC device 20 may correspond to the authentication using an ID/PW or the authentication method using a PIN.

Also, a manager or a user of the image forming apparatus 60 may manage the various authentication set ups 1201; for example, the manager or the user of the image forming apparatus 60 may set such that authentication may be performed without inputting a password with respect to the authentication method using an ID/PW via the screen 1200 of the authentication management application.

Figure 13:
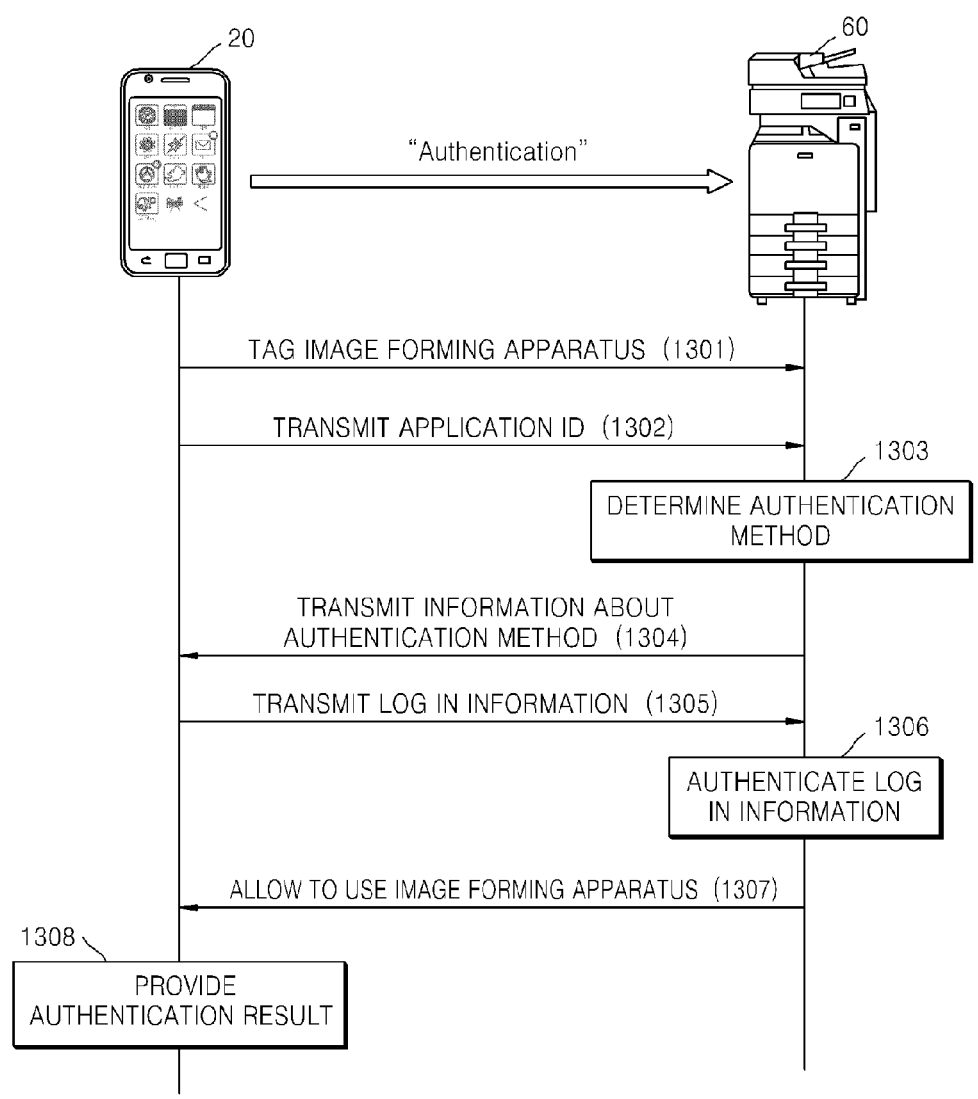
FIG. 13 is a diagram for explaining an operation of performing authentication between an image forming apparatus and an NFC device, according to an exemplary embodiment.

FIG. 13 is a diagram for explaining an operation of conducting authentication between an image forming apparatus 60 and an NFC device 20, according to an embodiment. The operation of performing authentication between the image forming apparatus 60 and the NFC device 20 corresponds to operations that are processed in time series in the image forming apparatus 60 and the NFC device 20 illustrated in FIG. 6, and thus, even details that are omitted below but described above with reference to FIG. 6 above may also be applied to the operation of providing an extended UI screen of FIG. 13.

In operation 1301, the NFC module 220 of the NFC device 20 tags with the NFC module 620 of the image forming apparatus 60 via an NFC function. Here, an NFC authentication application may be being executed on the NFC device 20 in advance.

In operation 1302, the NFC module 220 of the NFC device 20 transmits an application ID regarding the NFC authentication application being executed on the NFC device 20, to the image forming apparatus 60.

In operation 1303, the authentication type determining unit 6101 of the control unit 610 included in the image forming apparatus 60 determines an authentication method corresponding to the NFC authentication application being executed on the NFC device 20 based on the application ID received via the NFC module 620.

In operation 1304, the NFC module 620 of the image forming apparatus 60 transmits information about the determined authentication method, to the NFC device 20.

In operation 1305, the NFC module 220 of the NFC device 20 transmits log in information of a user input via the user interface unit 240 or log in information stored in the external server 62 to the image forming apparatus 60.

In operation 1306, the authentication unit 6102 of the control unit 610 included in the image forming apparatus 60 authenticates the user or the NFC device 20 by using the log in information received from the NFC device 20 via the NFC module 620.

In operation 1307, the authentication unit 6102 allows the user or the NFC device 20 to use the image forming apparatus 60 based on the received authentication result of the log in information.

In operation 1308, the NFC device 20 provides a result of authentication via the user interface unit 240.

Figure 14:
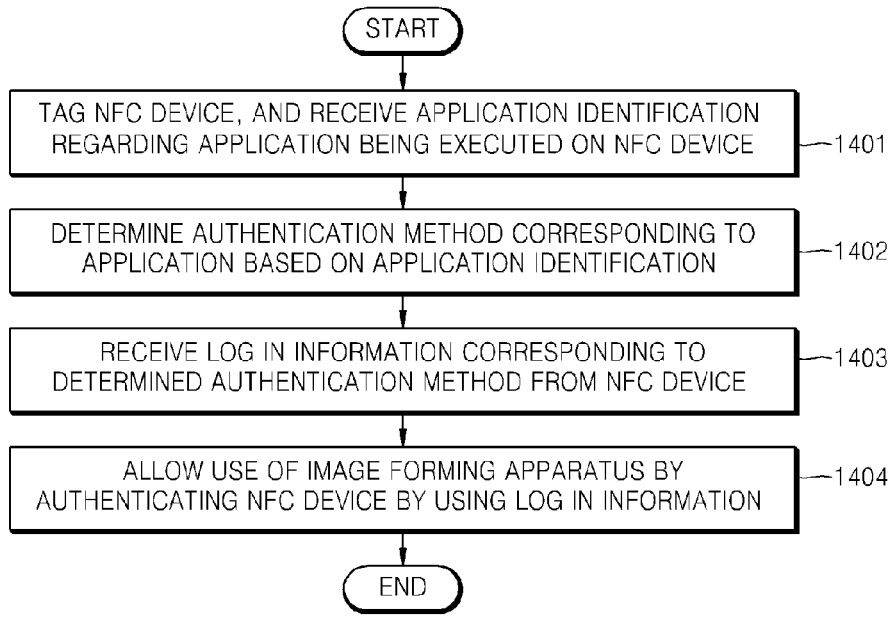
FIG. 14 is a flowchart illustrating a method of authenticating an NFC device in an image forming apparatus, according to an exemplary embodiment.

FIG. 14 is a diagram for explaining an operation of authenticating an NFC device 20 in an image forming apparatus 60, according to an embodiment. The authentication operation of FIG. 14 corresponds to operations that are processed in time series in the image forming apparatus 60 and the NFC device 20 illustrated in FIG. 6, and thus, even details that are omitted below but described above with reference to FIG. 6 above may also be applied to the operation of providing an extended UI screen of FIG. 14.

In operation 1401, when the NFC device 20 is tagged, the NFC module 620 receives an application ID of an NFC authentication application being executed on the tagged NFC device 20.

In operation 1402, the authentication type determining unit 6101 of the control unit 610 determines an authentication method corresponding to the NFC authentication application based on the received application ID.

In operation 1403, the NFC module 620 receives log in information corresponding to the determined authentication method, from the NFC device 20.

In operation 1404, the authentication unit 6102 of the control unit 610 allows the NFC device 20 to use the image forming apparatus 60 by authenticating the NFC device 20 by using the received log in information.

Figure 15:
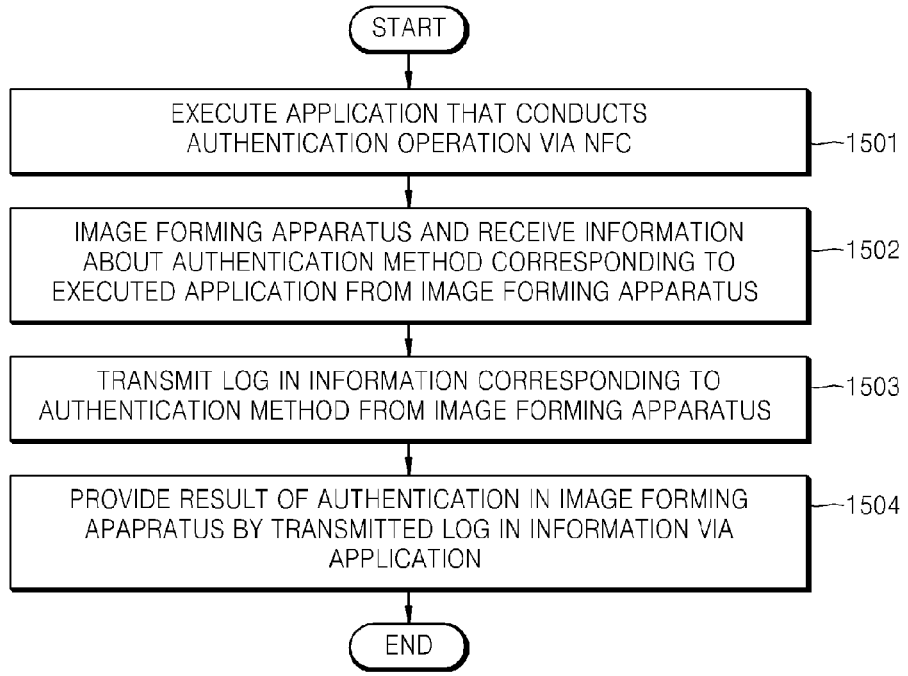
FIG. 15 is a flowchart illustrating a method of authenticating an NFC device to an image forming apparatus, according to an exemplary embodiment.

FIG. 15 is a flowchart illustrating a method of authenticating the NFC device 20 to the image forming apparatus 60, according to an embodiment. The authentication method of FIG. 15 corresponds to operations that are processed in time series in the image forming apparatus 60 and the NFC device 20 illustrated in FIG. 6, and thus, even details that are omitted below but described above with reference to FIG. 6 above may also be applied to the method of providing an extended UI screen of FIG. 15.

In operation 1501, the control unit 210 executes an NFC authentication application for performing authentication via NFC.

In operation 1502, when the image forming apparatus 60 is tagged, the NFC module 220 receives information about an authentication method corresponding to the executed application, from the tagged image forming apparatus 60.

In operation 1503, the NFC module 220 transmits log in information corresponding to the received authentication method, to the image forming apparatus 60.

In operation 1504, the control unit 210 provides a result of authentication performed in the image forming apparatus 60 by using the transmitted log in information via an application.

As described above, according to the one or more of the above exemplary embodiments, only NFC devices whose authentication is completed in an image forming apparatus supporting NFC may be allowed to use the image forming apparatus, and thus, indiscrete use of the image forming apparatus by non-authenticated NFC devices may be prevented.

Embodiments may be written as computer programs that may be implemented in general-use digital computers that execute the programs using a computer readable recording medium.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

While embodiments have been particularly shown and described, it will be understood by those of ordinary skill in the art that various changes in form and details may be made to embodiments without departing from the spirit and scope of the present disclosure as defined by the appended claims and their equivalents. The above exemplary embodiments should be considered in a descriptive sense only and not for purposes of limitation. Therefore, the scope of the invention is defined not by the detailed description but by the appended claims and their equivalents, and all differences within the scope will be construed as being included in the present disclosure.

What is claimed is:

1. An image forming apparatus for authenticating an external near field communication (NFC) device, comprising:
   an NFC module configured to receive an application identification of an application being executed on the NFC device when the NFC device is tagged; and
   a control unit configured to determine an authentication method corresponding to the application based on the received application identification,
   wherein the application identification includes information for identifying the authentication method that is executable via the application installed in the NFC device,
   wherein the application identification includes different information according to types of the application installed in the NFC device, and
   wherein the control unit is further configured to:
      authenticate log in information corresponding to the determined authentication method, received from the NFC device via the NFC module, and
      allow use of the image forming apparatus based on a result of authentication.

2. The image forming apparatus of claim 1, further comprising:
   a storage unit in which authentication profiles for managing executable authentication methods according to types of applications are stored in advance,
   wherein the control unit is further configured to determine the authentication method designated for the application by comparing the received application identification and the stored authentication profiles.

3. The image forming apparatus of claim 2, wherein the NFC module is further configured to transmit information about the determined authentication method to the NFC device.

4. The image forming apparatus of claim 1, further comprising:
a storage unit in which authentication profiles for managing log in information regarding users or NFC devices who or which are allowed to use the image forming apparatus are stored in advance,
wherein the control unit is further configured to determine the authentication method designated for the application by comparing the received application identification and the stored authentication profiles.

5. The image forming apparatus of claim 1, further comprising:
a user interface unit configured to receive a list of applications to be updated in an authentication profile or a user set up for log in information; and
a storage unit configured to store an authentication profile that is updated according to the received user set up.

6. The image forming apparatus of claim 1,
wherein the image forming apparatus supports a first authentication method using a smart card, a second authentication method using an identification (ID)/password (PW), and a third authentication method using a personal identification number (PIN), and
wherein the authentication for the NFC device is performed by using at least one of the second authentication method using an ID/PW and the third authentication method using a PIN.

7. The image forming apparatus of claim 1, wherein the control unit is further configured to allow a user corresponding to the log in information or the tagged NFC device to use the image forming apparatus.

8. A near field communication (NFC) device for authenticating an image forming apparatus, comprising:
a control unit configured to execute an application that conducts an authentication operation via NFC; and
an NFC module, when the image forming apparatus is tagged, is configured to:
transmit an application identification including information for identifying an authentication method that is executable via the application installed in the NFC device,
receive information for the authentication method corresponding to the executed application from the image forming apparatus, and
transmit log in information corresponding to the authentication method to the image forming apparatus,
wherein the application identification includes different information according to types of the application installed in the NFC device, and
wherein the control unit is further configured to provide a result of authentication of the log in information transmitted from the image forming apparatus and received from the image forming apparatus via the NFC module, via the application.

9. The NFC device of claim 8, wherein the executed application is an application that has a function of controlling the image forming function of the image forming apparatus when the authentication operation via NFC is completed.

10. The NFC device of claim 8, wherein the NFC module is further configured to receive information for the authentication method determined in the image forming apparatus based on the transmitted application identification.

11. The NFC device of claim 8, further comprising:
a user interface unit configured to provide a log in screen corresponding to the authentication method of the application,
wherein the NFC module is further configured to transmit the log in information input via the log in screen.

12. The NFC device of claim 11,
wherein the user interface unit is further configured to provide the log in screen in which log in information input fields corresponding to authentication methods are provided on different tabs or on a single tab, and
wherein on the log in screen, only log in information input fields corresponding to the received authentication method are activated.

13. The NFC device of claim 8, wherein the NFC module is further configured to transmit log in information that is stored by a user in advance, to at least one of a storage unit included in the NFC device or an external server.

14. A method of authenticating an external near field communication (NFC) device in an image forming apparatus, the method comprising:
receiving an application identification regarding an application being executed on the NFC device when the NFC device is tagged;
determining an authentication method corresponding to the application based on the received application identification;
receiving log in information corresponding to the determined authentication method from the NFC device; and
allowing use of the image forming apparatus by authenticating the NFC device by using the received log in information,
wherein the application identification includes information for identifying the authentication method that is executable via the application installed in the NFC device, and
wherein the application identification includes different information according to types of the application installed in the NFC device.

15. At least one computer readable medium storing computer readable instructions that control at least one processor to implement the method of claim 14.

16. A method of authenticating an external near field communication (NFC) device to an image forming apparatus, the method comprising:
executing an application that conducts an authentication operation via NFC;
transmitting an application identification including information for identifying an authentication method that is executable via the application installed in the NFC device;
receiving information for the authentication method corresponding to the executed application from the image forming apparatus when the image forming apparatus is tagged;
transmitting log in information corresponding to the authentication method from the image forming apparatus; and
providing a result of authentication by using the log in information transmitted from the image forming apparatus, via the application,
wherein the application identification includes different information according to types of the application installed in the NFC device.

17. The method of claim 16,
wherein the receiving of information for the authentication method comprises receiving information for the authentication method determined in the image forming apparatus based on the transmitted application identification.

* * * * *